July 11, 1967
A. L. KORR
3,330,203
FOOD HEATING OVEN
Filed Oct. 23, 1965
2 Sheets-Sheet 1
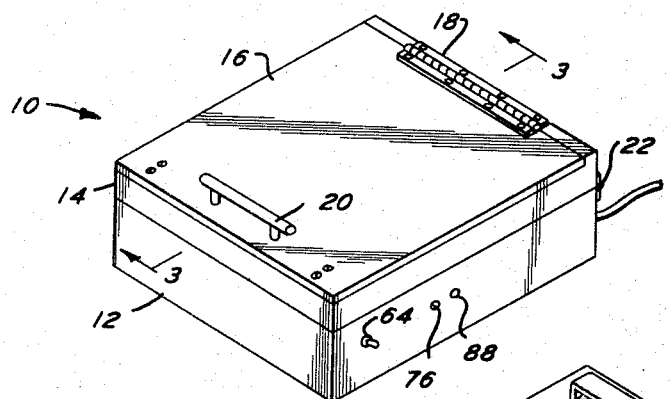
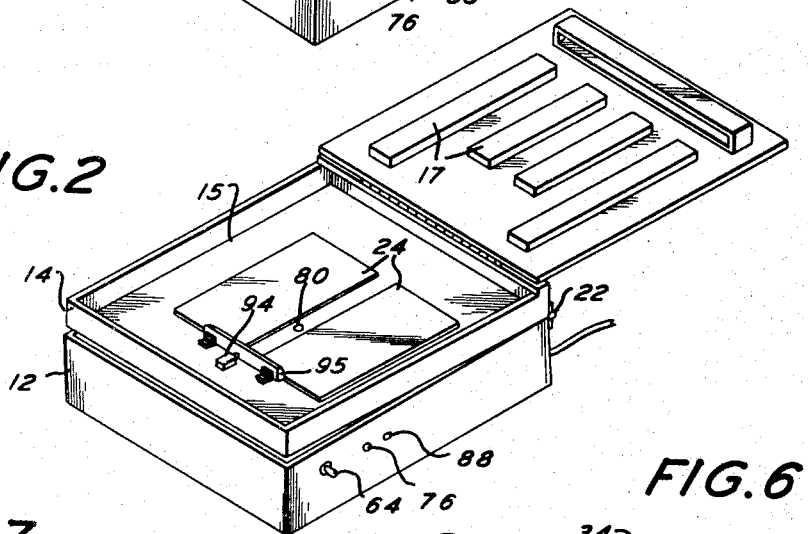
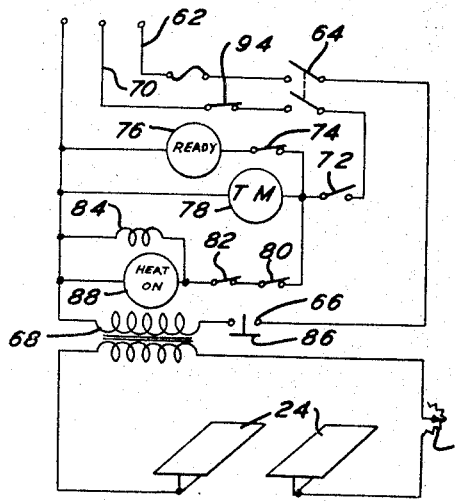
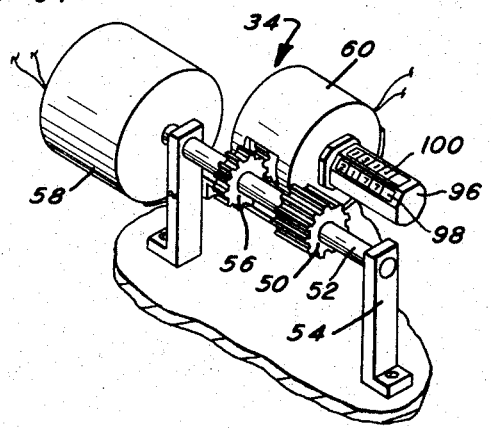
INVENTOR
ABRAHAM L. KORR
BY Seidel & Gonda
ATTORNEYS.

July 11, 1967
A. L. KORR
3,330,203
FOOD HEATING OVEN
Filed Oct. 23, 1965
2 Sheets-Sheet 2
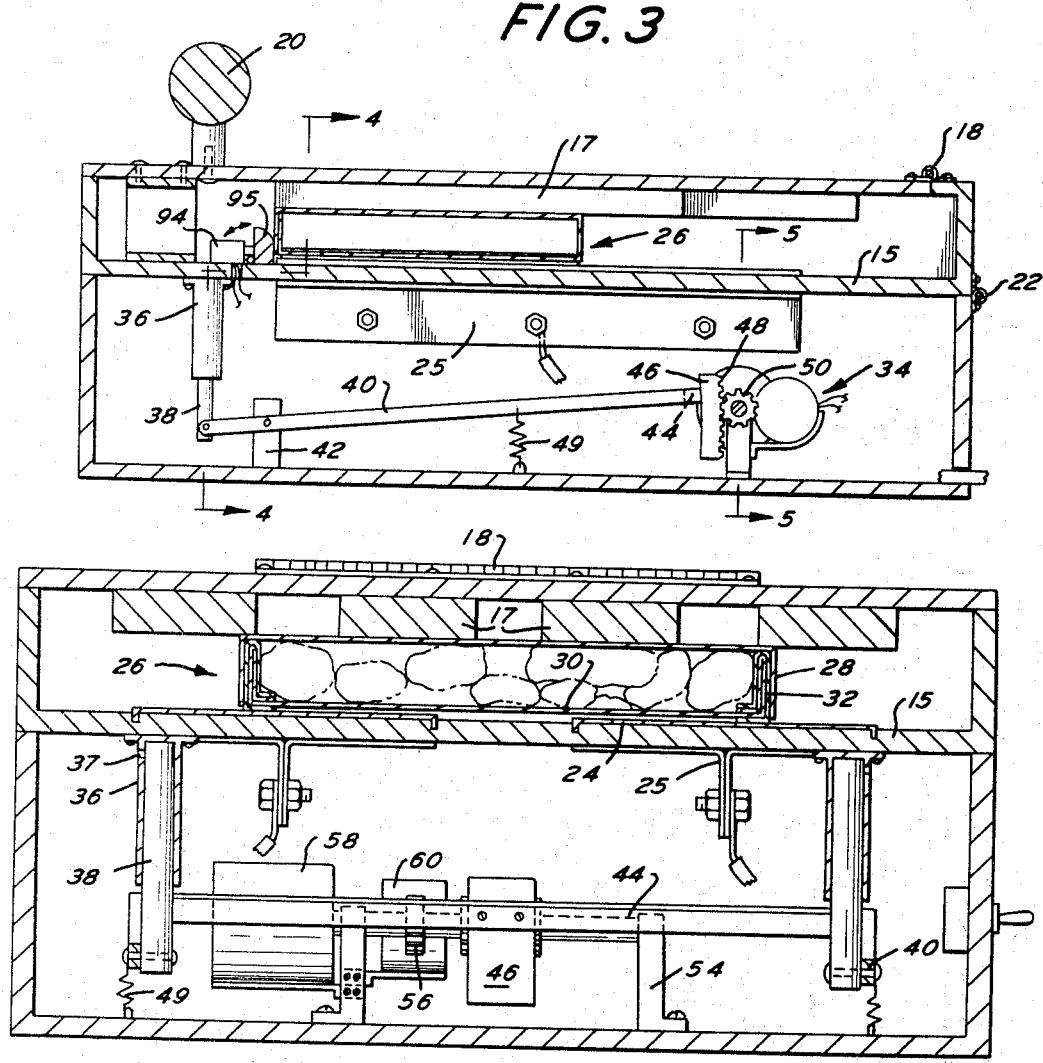
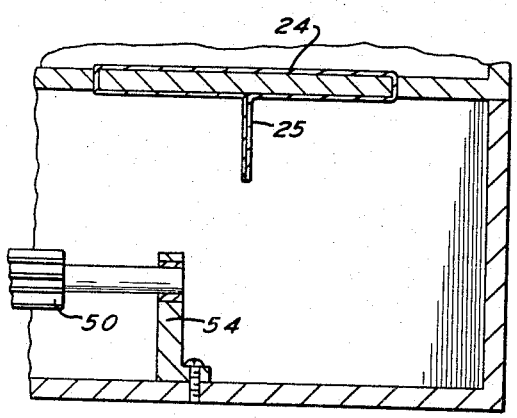
INVENTOR
ABRAHAM L. KORR
BY Seidel & Gonda
ATTORNEYS.

United States Patent Office 3,330,203
Patented July 11, 1967

3,330,203
FOOD HEATING OVEN
Abraham L. Korr, 8712 Hickory Drive,
Philadelphia, Pa. 19136
Filed Oct. 23, 1965, Ser. No. 503,565
10 Claims. (Cl. 99—332)

ABSTRACT OF THE DISCLOSURE

A food heating oven having means responsive to the weight of a package placed therein for regulating the amount of heat applied to the package and also having means for making a record of the weight of the package.

This invention relates to food heating ovens.

More particularly, this invention relates to food heating ovens of the type which pass an electric current directly through the food to be heated.

With the increasing consumption of prepared foods, a need has arisen in the restaurant and vending industries for an apparatus which rapidly and efficiently heats packaged foods.

Although numerous such apparatus have heretofore been proposed, all have been somewhat limited in their utility due to the fact that manual adjustment is required to prepare them for use with packages of any given type. Thus, with the prior art devices, it is necessary to have an attendant familiar with the various types of foods to be heated, the appropriate times and temperatures for the various foods, and sufficiently skilled to properly adjust the device. To aid the attendant, it is common practice to place a placard or instruction plate on the device giving the necessary information.

The prior art devices are inherently limited in their usefulness due to the fact that they rely on the knowledge of the operator to insure proper heating. Thus, with newly available products, or familiar products in sizes with which the operator is unacquainted, spoilage due to overcooking, or service of the food in an unappetizing partially cooked state is likely.

The present invention is a food heating oven which automatically weighs a food package, sets a timer to provide heat for only an appropriate interval, and automatically terminates heating should the temperature become excessive.

Accordingly, it is an object of this invention to provide an automatic electric food heating oven.

It is another object of this invention to provide a food heating oven for packages having different weights.

It is still another object of this invention to provide a food heating oven which automatically supplies the correct amount of heat.

It is still another object of this invention to provide a food heating oven which records the cumulative weight of food packages heated.

It is yet another object of this invention to provide an automatic food heating oven which is simple to use, even for inexperienced operators.

Other objects will appear hereinafter.

For the purpose of illustrating the invention, there is shown in the drawings a form which is presently preferred, it being understood, however, that the invention is not limited to the precise arrangements and instrumentalities shown.

FIGURE 1 is a perspective view of the novel food heating oven in the operative position.

FIGURE 2 is a perspective view of the food heating oven with the lid open, ready to receive a package for heating.

FIGURE 3 is a sectional view taken along the line 3—3 in FIGURE 1, and showing a food container in position to be heated.

FIGURE 4 is a sectional view taken along the line 4—4 in FIGURE 3.

FIGURE 5 is a partial sectional view showing an electrode of the novel food heating oven.

FIGURE 6 is a perspective view showing details of the automatic controls of the novel oven.

FIGURE 7 is a schematic diagram of the electrical circuit used in the novel oven.

Referring to the drawings in detail, wherein like numerals indicate like elements, there is illustrated in FIGURE 1 a food heating oven indicated generally by the numeral 10. The food heating oven includes a lower base portion 12 and an upper base portion 14. The upper base portion 14 includes a peripheral wall and a lower platform 15.

A lid 16 is pivotally secured to the upper base portion 14 by means of a hinge 18. The lid 16 has pressure applying strips 17 secured to its lower surface. A handle 20 is secured to the upper surface of the lid 16.

The upper base portion 14 is secured to the lower base portion 12 by means of a hinge 22.

A pair of plate type electrodes 24 are placed on the platform 15 of the upper base portion 14.

Referring to FIGURE 5, it is seen that the electrodes 24 include depending portions 25 which pass through slots in the platform 15, and to which the electrical connectors may be secured.

A food container 26 may be placed on the upper base portion 14 in surface contact with the electrodes 24. The strips 17 and the weight of the lid 16 insure proper contact.

The food container 26 includes a receptacle portion 30 and a cover member 28. The receptacle portion 30 includes electrode portions 32, which may conveniently take the form of aluminum foil or other electrically conducting film.

As seen in FIGURE 4, the electrode portions 32 extend from within the receptacle portion 30 and in contact with the contents of the container to a position overlying a portion of the bottom of the receptacle portion 30. Thus, when the food container 26 is placed on the electrodes 24, the electrode portions 32 of the receptacle portion 30 are in electrical contact therewith.

Referring to FIGURE 6, the reference numeral 34 indicates generally a timer and counter mechanism which forms a part of the novel food heating oven.

A pair of vertically disposed sleeves 36 are secured to the lower surface of the platform 15. The sleeves 36 include air outlet openings 37 to avoid entrapment of air in the sleeves.

Slidably engaged in the sleeves 36 are upstanding pins 38. The upstanding pins 38 are pivotably secured at their lower ends to elongated levers 40. The levers 40 are pivotably secured to upstanding brackets 42. The brackets 42 are fastened to the lower base portion 12.

A transverse tie bar 44 is secured between respective ends of the elongated levers 40. An arcuate sector 46, which includes gear teeth 48, is fixed to a medial portion of the transverse tie bar 44.

A pair of springs 49 have their respective ends secured to the lower base portion 12 and the elongated lever 40. It is seen that the springs 49 tend to bias the arcuate sector 46 in a downward direction, and the upstanding pins 38 in an upward direction.

The gear teeth 48 of the arcuate sector 46 are in driving engagement with a spur gear 50.

As seen in FIGURE 6, the spur gear 50 is fixedly secured to a shaft 52. The shaft 52 is rotatably supported by means of brackets 54. Also fixedly secured to the shaft 52 is a second spur gear 56.

A rheostat 58 is fixedly secured to one of the brackets 54. One end of the shaft 52 is in driving engagement with the adjustable member of the rheostat 58, the purpose of which will be more fully explained later.

Also shown in FIGURE 6 is a timer 60. The spur gear 56 is in driving engagement with a portion of the timer 60.

Referring now to FIGURE 7, there is shown schematically in the upper lefthand portion of the figure a 240-volt 3-wire line. A 240-volt line 62 passes through a fuse, not numbered, a pair of contacts of a double pole-single throw starter switch, a pair of normally open relay contacts 66, and the primary winding of a transformer 68. A 120-volt line 70 passes through a position switch 94, to be more fully described later, a pair of contacts of the switch 64, and through a switch 72. The switch 72 is so arranged that when the lid 16 is opened, the switch is also opened. Current flowing through the switch 72 may take one of three paths. The uppermost path in FIGURE 7 includes a timer actuated switch 74 and a ready lamp 76. The middle path includes a timer motor 78. The lowermost path includes a thermostatic switch 80; a timer actuated switch 82; and a pair of parallel braches containing a coil 84 of a power contactor switch and a "heat on" lamp 88, respectively.

The coil 84 controls an armature 86, which is adapted to close the normally open relay contacts 66 upon actuation.

The secondary side of the transformer 68 is connected to the rheostat 58 and the electrodes 24 in series.

The operation of the device in accordance with the invention is as follows:

A food container 26 is placed on the platform 15 in contact with the electrodes 24.

As shown in FIGURE 2, an elongated sensing bar 95 is pivotably attached to the upper surface of the platform 15. The position switch 94 is closed when the sensing bar 95 is in the position shown in FIGURES 2 and 3. It should be understood, however, that the sensing bar 95 is to be biased by means not shown to a raised position, corresponding to an open position of the switch 94.

As shown in FIGURE 3, when a food container 26 is placed against the sensing bar 95, the sensing bar 95 is held in its position corresponding to the closed position of the switch 94. Thus, unless the food container 26 is properly placed, the switch 94 remains open, and the oven cannot be operated.

As shown in FIGURE 2, when no food container is resting on the platform 15, the upper base portion 14 is rotated about its hinge 22 so that its front portion is raised slightly away from the front portion of the lower base portion 12. The upper base portion 14 will be so positioned due to the force exerted on its underside by the upstanding pins 38, which are biased upwardly by the springs 49.

It is apparent that placing of the food container 26 on the platform 15 causes rotation of the upper base portion 14 about the hinge 22 in opposition to the spring bias. Yielding of the springs 49 results in movement of the elongated levers 40, the tie bar 44 and the arcuate sector 46. The amount of yielding is, of course, a function of the total weight of the food container 26. Thus, movement of the arcuate sector 46, and consequently, shaft 52 and gear 56 is also a function of the weight of the food container. Rotation of the shaft 52 determines the setting of the rheostat 58, and hence the current flow through the food container. Rotation of the gear 56 sets the timer 60, and hence determines the length of time during which current is applied.

It will now be apparent that the position of the food container 26 on the platform 15 has a considerable effect on the operation of the device. If placed closer to the hinge 22, the moment created by the food container is decreased, and consequently the deflection of the arcuate sector is decreased. The sensing bar 95 and position switch 94 serve to prevent an inexperienced operator from improperly placing the food container. It is, of course, apparent that members 94 and 95 may be omitted if desired.

After placement of the food container 26, the lid 16 may be closed. Closing of the lid 16 results in closing of the lid actuated switch 72.

FIGURE 7 shows the circuit in a "ready" condition with the lid 16 closed, but no food container on platform 15. The timer actuated switch 74, before setting of the timer 60, is in the closed position. Also, because the lid 16 is closed, the switch 72 is closed. Thus, when the double pole-switch 64 is closed, the "ready" lamp 76 lights.

Placing of the food container 26 on the platform 15, and consequent setting of the timer 60, opens the timer actuated switch 74 and prevents relighting of the lamp 76 when the lid is once again closed.

With the switch 64 thrown, the package 26 in place, and the lid 16 closed, current flows through the timer motor 78, the coil 84 of the power contactor switch and the "heat on" lamp 88. Current flow in the coil 84 causes the armature 86 to close the normally open relay contacts 66.

Upon closing of the relay contacts 66, current flows through the 240-volt line containing the primary windings of the transformer 68. Current then flows in the secondary coil of the transformer 68, through the rheostat 58, one of the electrodes 24, the food container 26, and the second electrode 24.

In normal operation the timer runs for its pre-set interval, after which it opens the timer actuated switch 82, and stops.

Opening of the timer actuated switch 82 causes the "heat on" lamp 88 to be extinguished, and stops the flow of current to the coil 84 of the power contactor switch. When the flow of current to the coil 84 ceases, the armature 86 moves out of contact with the normally open contact 66, and current to the transformer 68 is cut off. Running of the timer 60 for its pre-set time also results in closing of the timer actuated switch 74 and relighting of the "ready" lamp 76. Relighting of the lamp 76 serves as a signal to the operator that heating is completed.

In the event that temperature within the oven becomes excessive, thermostatic switch 80 opens, cutting off current to the coil 84 and the "heat on" lamp 88. Thus, opening of the thermostatic switch 80 cuts off the flow of current to the transformer 68 and the electrodes 24.

As an added feature, the novel food heating oven can be made to keep a running record of the total weight of food heated. Thus, a conventional counter 96, may be incorporated into the timer 60. Since movement of the gear 56 is a function of the weight of the food container, movement of the counter 96 in response to movement of the gear 56 provides a handy weight indication at 98. The counter may be provided with a cumulative visual indicator 100 for rapid checking, for example, at the end of a given month.

The present invention may be embodied in other specific forms without departing from the spirit or essential attributes thereof, and accordingly, reference should be made to the appended claims rather than to the foregoing specification as indicating the scope of the invention.

I claim:

1. An oven for heating food comprising a lower base portion, an upper base portion adapted to receive an electrically conductive food package, said upper base portion being movable with respect to said lower base portion in response to the weight of the food package, electrode means on said upper base portion for contacting said package, and means responsive to movement of said upper base portion for regulating the amount of heat supplied by said electrodes in accordance with the weight of the food package.

2. Apparatus in accordance with claim 1 wherein said means responsive to movement of said upper base portion includes current regulating means.

3. Apparatus in accordance with claim 1 wherein said means responsive to movement of said upper base portion includes timer means for regulating the time during which current is supplied to said electrodes.

4. An oven for heating foods comprising a lower base portion and an upper base portion adapted to receive an electrically conductive food container, said upper base portion being pivotably secured to said lower base portion so that placing of said food container on said upper base portion causes pivoting of said upper base portion with respect to said lower base portion, means yieldably resisting pivoting of said upper base portion with respect to said lower base portion, a lid pivotably secured to said upper base portion, electrode means on said upper base portion for contacting said food container, and means responsive to pivotal movement of said upper base portion with respect to lower base portion for regulating the amount of heat supplied by said oven.

5. Apparatus in accordance with claim 4 wherein said means responsive to pivotal movement of said upper base portion with respect to said lower base portion includes current regulating means.

6. Apparatus in accordance with claim 4 wherein said means responsive to pivotal movement of said upper base portion with respect to said lower base portion includes timer means for regulating the time during which current is supplied to said electrodes.

7. Apparatus in accirdance with claim 4 wherein said lid includes pressure applying means for holding a food container in contact with said electrode means.

8. An oven for heating food comprising a lower base portion and an upper base portion adapted to receive an electrically conductive food container, said upper base portion being pivotably secured to said lower base portion so that placing of said food container on said upper base portion causes pivoting of said upper base portion with respect to said lower base portion, means yieldably resisting pivoting of said upper base portion with respect to said lower base portion, a lid pivotably secured to said upper base portion, electrode means on said upper base portion for contacting said food container, means responsive to pivotal movement of said upper base portion with respect to said lower base portion for regulating the amount of heat supplied by said oven, said last mentioned means including current regulating means and timer means for regulating the time during which current is supplied to said electrodes, a temperature sensing switch in said oven for interrupting the flow of current when the temperature in said oven exceeds a predetermined value, a lid actuated switch for interrupting the flow of current in response to opening of said lid, and a position sensing switch, said position sensing switch being effective to prevent current flow when said food package is improperly placed.

9. Apparatus in accordance with claim 8 wherein said timer means includes means for recording the weight of the food container.

10. Apparatus in accordance with claim 8 wherein said timer means includes means for recording the cumulative weight of food containers heated.

References Cited
UNITED STATES PATENTS

| | | | |
|---|---|---|---|
| 1,901,616 | 3/1933 | Vaughan | 99—331 |
| 3,259,056 | 7/1966 | King | 99—325 |

BILLY J. WILHITE, *Primary Examiner.*